(12) United States Patent
Ura

(10) Patent No.: US 9,511,796 B2
(45) Date of Patent: Dec. 6, 2016

(54) POWER STEERING SYSTEM

(71) Applicant: JTEKT CORPORATION, Osaka-shi, Osaka (JP)

(72) Inventor: Noritake Ura, Anjo (JP)

(73) Assignee: JTEKT CORPORATION, Osaka (JP)

(*) Notice: Subject to any disclaimer, the term of this patent is extended or adjusted under 35 U.S.C. 154(b) by 127 days.

(21) Appl. No.: 14/280,246

(22) Filed: May 16, 2014

(65) Prior Publication Data

US 2014/0345965 A1 Nov. 27, 2014

(30) Foreign Application Priority Data

May 22, 2013 (JP) ................................ 2013-108266

(51) Int. Cl.
| | |
|---|---|
| *B62D 5/04* | (2006.01) |
| *B62D 5/30* | (2006.01) |
| *B62D 5/065* | (2006.01) |
| *B62D 5/083* | (2006.01) |

(52) U.S. Cl.
CPC ........... *B62D 5/0835* (2013.01); *B62D 5/0463* (2013.01); *B62D 5/0484* (2013.01); *B62D 5/065* (2013.01); *B62D 5/30* (2013.01)

(58) Field of Classification Search
CPC .......... B62D 5/30; B62D 5/32; B62D 5/0484; B62D 5/0463; B62D 5/065; B62D 5/00; B62D 5/0448; G01L 5/221
USPC ........ 180/405, 406, 407, 402, 403, 443, 444
See application file for complete search history.

(56) References Cited

U.S. PATENT DOCUMENTS

| | | | | |
|---|---|---|---|---|
| 6,220,385 | B1* | 4/2001 | Bohner | B62D 5/003 180/403 |
| 7,530,422 | B2* | 5/2009 | Bolourchi | B62D 5/008 180/406 |
| 7,721,841 | B2* | 5/2010 | Shibata | B62D 5/008 180/407 |
| 8,162,095 | B2* | 4/2012 | Bootz | B60R 25/021 180/403 |
| 8,833,506 | B2* | 9/2014 | Sunaga | B62D 5/06 180/406 |
| 2003/0178243 | A1* | 9/2003 | Mosler | B62D 5/008 180/443 |
| 2005/0060075 | A1* | 3/2005 | Llewellyn | B62D 5/0484 701/43 |

(Continued)

FOREIGN PATENT DOCUMENTS

| | | |
|---|---|---|
| DE | 102009010878 A1 | 10/2009 |
| EP | 1529715 A2 | 5/2005 |
| JP | B2-5034446 | 7/2012 |

OTHER PUBLICATIONS

Nov. 26, 2015 Search Report issued in European Patent Application No. 14169106.3.

*Primary Examiner* — Anne Marie Boehler
(74) *Attorney, Agent, or Firm* — Oliff PLC

(57) ABSTRACT

A power steering system includes an EPS and a HPS. At normal times, an assist force required by a steering system is computed based on a steering torque and a vehicle speed, and the required assist force is generated by the EPS and the HPS. The torsional stiffness of a torsion bar of the HPS is equal to or substantially equal to the torsional stiffness of a torsion bar of the EPS. Therefore, even if the EPS malfunctions, it is possible to gain the steering feel similar to that when the EPS is operating properly.

6 Claims, 12 Drawing Sheets

(56) References Cited

U.S. PATENT DOCUMENTS

2014/0008141 A1* 1/2014 Kageyama ............... B62D 5/00
180/400
2014/0012470 A1* 1/2014 Kim .................... B62D 5/0409
701/42

* cited by examiner

F I G . 9
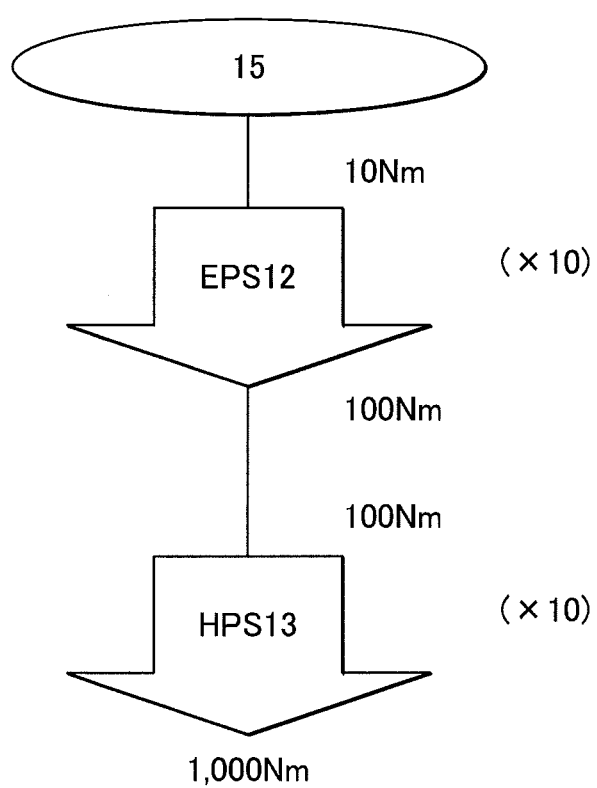

POWER STEERING SYSTEM

INCORPORATION BY REFERENCE

The disclosure of Japanese Patent Application No. 2013-108266 filed on May 22, 2013 including the specification, drawings and abstract, is incorporated herein by reference in its entirety.

BACKGROUND OF THE INVENTION

1. Field of the Invention

The invention relates to a power steering system.

2. Description of Related Art

There is a conventional power steering system including both an electric steering assist device that uses a motor as a power source and a hydraulic steering assist device that uses an internal combustion engine, which serves as a vehicle axle driving source, as a power source, in order to apply assist torque to a steering system of a vehicle, as described in, for example, Japanese Patent No. 5034446.

The electric steering assist device is a column assist-type steering assist device. The electric steering assist device produces output torque by adding assist torque, which is generated by the motor, to input torque, which is input into a steering wheel, and then applies the output torque to the hydraulic steering assist device. The hydraulic steering assist device is a rack-and-pinion-type steering assist device including a rotary control valve. Upon application of the output torque from the electric steering assist device, the control valve is operated. Through the operation of the control valve, the flow path and the flow rate of hydraulic fluid that is supplied from a hydraulic pump to a power cylinder disposed in a rack body are switched based on a torsion angle of a torsion bar incorporated in the control valve. The power cylinder generates a rack driving force (steering assist force) as the hydraulic fluid is supplied to a cylinder chamber for right steering assist or a cylinder chamber for left steering assist. A solenoid relief valve is disposed between a high-pressure flow path that leads to the hydraulic pump and a low-pressure flow path that leads to a reservoir tank.

At normal times, the electric steering assist device does not generate assist torque using the motor when the input torque is lower than a set value. That is, the input torque is used as it is, as the output torque from the electric steering assist device. Assist torque corresponding to the output torque is generated by the hydraulic steering assist device until the output torque reaches the set value. After the output torque reaches the set value, the electric steering assist device starts generating assist torque, while the solenoid relief valve is opened and thus part of the hydraulic fluid is returned to the reservoir tank, so that the assist torque that is generated by the hydraulic steering assist device is limited. In this case, the output torque produced by the electric steering assist device is a value that is obtained by adding the assist torque generated by the motor to the input torque input into the steering wheel.

If one of the electric steering assist device and the hydraulic steering assist device malfunctions, steering assist is continued by the other one of the hydraulic steering assist device and the electric steering assist device, which is operating properly. If the electric steering assist device malfunctions, a set valve opening pressure, at which the solenoid relief valve is opened, is changed to a value higher than that used at normal times. Because it is possible to increase the flow rate of the hydraulic fluid that is supplied to the power cylinder to a flow rate higher than that used at normal times, the hydraulic steering assist device is able to generate assist torque corresponding to the torque applied to the hydraulic steering assist device not only when the torque applied to the hydraulic steering assist device is lower than the set value but also when the torque applied thereto is equal to or higher than the set value. That is, if the electric steering assist device malfunctions, a shortfall in the assist torque due to the malfunctioning is covered by the steering assist force generated the hydraulic steering assist device.

If the hydraulic steering assist device malfunctions, the electric steering assist device generates assist torque using the motor even when the input torque input into the steering wheel is lower than the set value.

In the power steering system according to Japanese Patent No. 5034446, the control valve of the hydraulic steering assist device is operated based on the output torque from the electric steering assist device. The stiffness (spring constant) of the torsion bar of the control valve is set based on the output torque from the electric steering assist device. That is, the torsion bar is appropriately twisted upon application of the output torque from the electric steering assist device operating properly. As a result, desired operation characteristics of the control valve are obtained. Therefore, if the electric steering assist device malfunctions, a steering feel similar to that before occurrence of the malfunction is obtained until the input torque input into the steering wheel reaches the set value. However, in order to make the hydraulic steering assist device deliver sufficiently high performance when the input torque exceeds the set value, the input torque needs to be higher than that at normal times because assist torque from the motor is not obtained. In addition, there is a possibility that the opening degree of the control valve and thus the steering assist force due to hydraulic pressure will not be sufficiently obtained because high input torque is required. This leads to deterioration of the steering feel.

SUMMARY OF THE INVENTION

One object of the invention is to provide a power steering system that provides, even if an electric power steering malfunctions, a steering feel similar to that before occurrence of the malfunction.

A power steering system according to an aspect of the invention includes: an electric power steering including a motor serving as an electric actuator that generates a first steering assist force based on a torsion amount of a first torsion bar to which steering torque is applied; and a hydraulic power steering including a hydraulic actuator that generates a second steering assist force based on a flow rate of a hydraulic fluid supplied from a pump that operates using an internal combustion engine as a driving source, and a control valve that controls supply of the hydraulic fluid to the hydraulic actuator and drain of the hydraulic fluid from the hydraulic actuator based on a torsion amount of a second torsion bar to which the steering torque and the first steering assist force are applied. The second torsion bar has a torsional stiffness that is equal to or substantially equal to a torsional stiffness of the first torsion bar.

In this configuration, the torsional stiffness of the second torsion bar is equal to or substantially equal to the torsional stiffness of the first torsion bar. That is, when the same degree of torque is applied to each of the first torsion bar and the second torsion bar, the torsion amount of the first torsion bar and the torsion amount of the second torsion bar are equal to or substantially equal to each other. When the electric power steering malfunctions, the steering torque is applied as it is, to the second torsion bar via the first torsion bar. Thus, even if the electric power steering malfunctions, it is possible to gain the steering feel similar to that when the electric power steering is operating properly.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 9 is a conceptual diagram illustrating the concept of steering assist provided by the electric power steering and the hydraulic power steering at normal times in a comparative example;

DETAILED DESCRIPTION OF EMBODIMENTS

Figure 1:
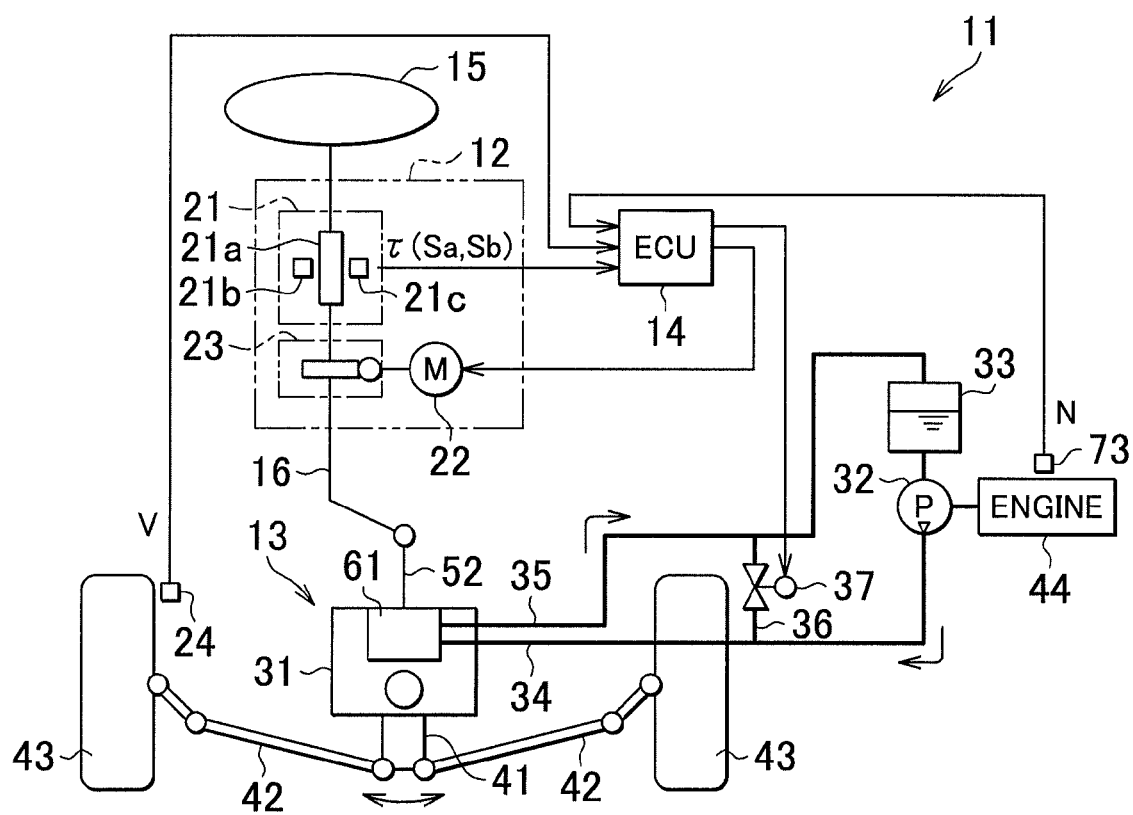
FIG. 1 is a configuration diagram illustrating the schematic configuration of a power steering system according to an embodiment of the invention.

Hereinafter, a power steering system 11 of a vehicle according to an embodiment of the invention will be described. As illustrated in FIG. 1, the power steering system 11 includes an electric power steering (EPS) 12, a hydraulic power steering (HPS) 13, and an electronic control unit (ECU) 14.

The EPS 12 is disposed on an intermediate portion of a steering shaft 16 to which a steering wheel 15 is connected. The EPS 12 includes a torque sensor 21, a motor 22, and a speed reducer 23.

The torque sensor 21 includes a torsion bar 21a disposed at an intermediate portion of the steering shaft 16, and two sensor elements 21b, 21c such as Halls IC that are disposed in the vicinity of the torsion bar 21a. The torsion bar 21a is twisted when steering torque is applied to the torsion bar 21a by a driver via the steering wheel 15. The two sensor elements 21b, 21c generate electrical signals Sa, Sb based on the torsion of the torsion bar 21a.

The motor 22 is connected to the steering shaft 16 via the speed reducer 23. The speed reducer 23 reduces the speed of rotation output from the motor 22, and transmits the torque, which is output from the motor and then amplified due to reduction in the rotation speed, to the steering shaft 16. That is, the torque generated by the motor 22 is applied to the steering shaft 16 as a steering assist force, so that the driver's operation of the steering wheel 15 is assisted.

The ECU 14 acquires results of detection by various sensors disposed in the vehicle as information indicating a command from the driver or a travelling state, and controls the motor 22 based on the acquired various information. Examples of the various sensors include, in addition to the torque sensor 21, a vehicle speed sensor 24 that detects a vehicle speed V that is a travelling speed of the vehicle. The ECU 14 detects a steering torque τ based on the electrical signals Sa, Sb generated by the two sensor elements 21b, 21c. The ECU 14 computes a target assist force, which is a target assist amount, based on the steering torque τ and the vehicle speed V, and then supplies the motor 22 with driving electric power used to generate the target assist force.

The HPS 13 is disposed at an end portion of the steering shaft 16, the end portion being on the opposite side of the steering shaft 16 from the steering wheel 15. The HPS 13 includes a recirculating ball screw-type (RBS-type) steering gear box 31, a pump 32, and a reservoir tank 33. A pump port of the steering gear box 31 is connected to the pump 32 through a discharge pipe 34. A tank port of the steering gear box 31 is connected to the reservoir tank 33 through a drain pipe 35. The discharge pipe 34 and the drain pipe 35 are connected to each other by a bypass pipe 36. The bypass pipe 36 is provided with an electric valve 37.

The steering gear box 31 converts the rotary motion of the steering shaft 16 into a right-left oscillating motion of a pitman arm 41. The oscillation of the pitman arm 41 is transmitted to right and left steered wheels 43 via right and left tie rods 42. The pump 32 is driven by an engine 44. As the pump 32 is driven, hydraulic fluid in the reservoir tank 33 is supplied to the steering gear box 31 through the discharge pipe 34. The hydraulic fluid drained from the steering gear box 31 is returned to the reservoir tank 33 through the drain pipe 35. The opening degree of the electric valve 37 is controlled by the ECU 14. As the opening degree of the electric valve 37 is increased, the flow rate of the hydraulic fluid that is diverted to the drain pipe 35, out of the hydraulic fluid discharged from the pump 32, is increased.

Figure 2:
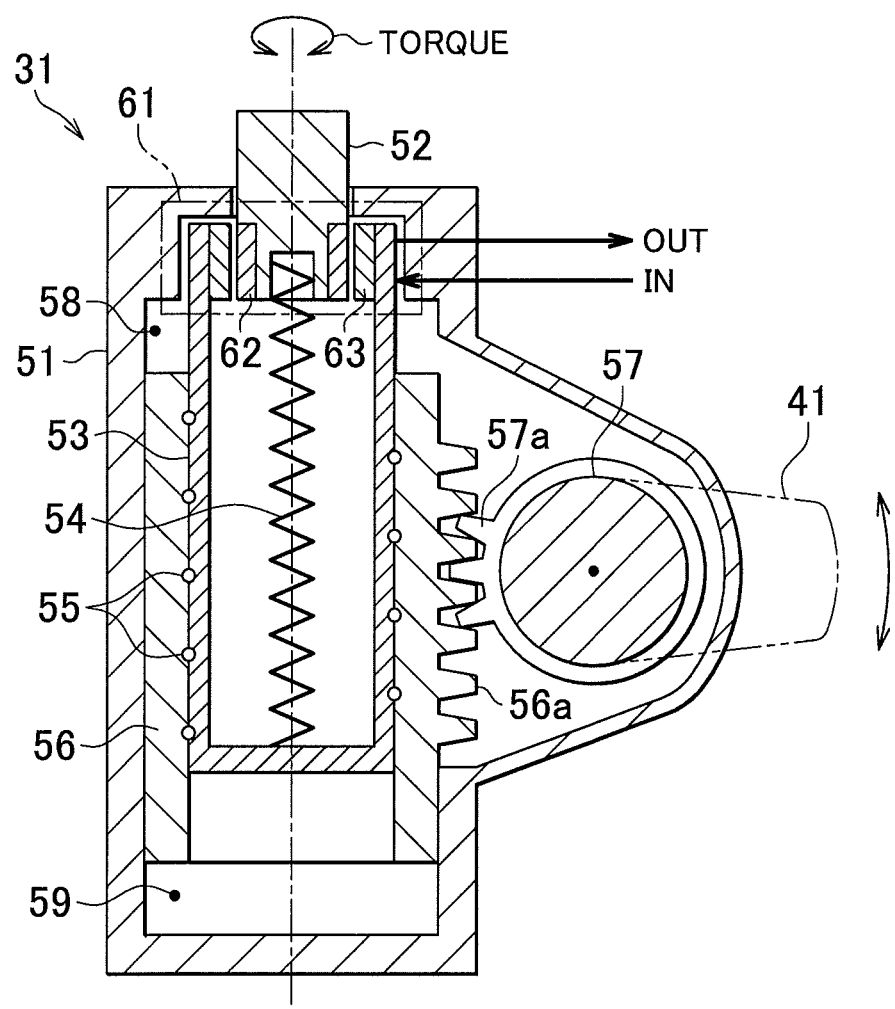
FIG. 2 is a view schematically illustrating the configuration of a steering gearbox in the embodiment.

As illustrated in FIG. 2, an input shaft 52, a hollow ball screw 53, a torsion bar 54, multiple balls 55, a ball nut 56, and a sector shaft 57 are disposed in a housing 51 of the steering gear box 31.

The input shaft 52 passes through an upper wall of the housing 51, and is supported so as to be rotatable relative to the housing 51. An outer end of the input shaft 52 is inserted in the steering shaft 16 so as to be rotatable relative to the steering shaft 16, and an inner end of the input shaft 52 is inserted in the ball screw 53 so as to be rotatable relative to the ball screw 53. The inner end of the input shaft 52 and an inner bottom face of the ball screw 53 are connected to each other by the torsion bar 54 disposed therebetween. The ball screw 53 is screwed to the ball nut 56 via the multiple circulating balls 55. The ball nut 56 is disposed so as to be slidable relative to a cylinder portion of the housing 51 in a direction along the axis of the ball nut 56. Rack teeth 56a are formed on an outer peripheral face of the ball nut 56 over a certain range in the axial direction of the ball nut 56. The rack teeth 56a are meshed with a sector gear 57a formed on the sector shaft 57 that is orthogonal to the axis of the ball nut 56. One end portion of the sector shaft 57 protrudes outside the housing 51, and the one end portion is provided with the pitman arm 41 such that the pitman arm 41 and the sector shaft 57 are rotatable together with each other. The right and left tie rods 42 are connected to the pitman arm 41.

The rotation of the steering wheel 15 is transmitted to the ball screw 53 via the input shaft 52 and the torsion bar 54. As the ball nut 56 is moved in its axial direction due to the rotation of the ball screw 53, the sector shaft 57 and thus the pitman arm 41 are oscillated from side to side via the sector gear 57a meshed with the rack teeth 56a.

The internal space of the housing 51 is partitioned into two oil chambers 58, 59 by the ball nut 56. The two oil chambers 58, 59 are located with the ball nut 56 interposed therebetween in the axial direction of the ball nut 56. The oil chamber 58 is located in an upper portion of the housing 51 in FIG. 2 and the oil chamber 59 is located in a lower portion of the housing 51 in FIG. 2. The hydraulic fluid is supplied to the two oil chambers 58, 59 via a control valve 61 disposed in the housing 51. As the hydraulic fluid from the pump 32 is supplied to one of the two oil chambers 58, 59 via the control valve 61, a difference in pressure between the two oil chambers 58, 59 is caused. As the ball nut 56 functions as a piston in response to the pressure difference and is pressed along the axial direction of the ball nut 56, an assist force based on the hydraulic pressure is applied to the tie rod 42 (steering mechanism) via the sector shaft 57 and the pitman arm 41.

Upon application of torque to the input shaft 52, the input shaft 52 rotates. The control valve 61 is a rotary valve that controls supply or drain of the hydraulic fluid to or from the two oil chambers 58, 59 based on the torque applied to the input shaft 52, that is, the rotation of the input shaft 52. When the input shaft 52 rotates clockwise relative to the ball screw 53, the pump 32 and the oil chamber 58 communicate with each other. When the input shaft 52 rotates counterclockwise relative to the ball screw 53, the pump 32 and the oil chamber 59 communicate with each other. (ここまでチェック完了)

The control valve 61 includes an inner valve 62 disposed on an outer periphery of the input shaft 52, and an outer valve 63 disposed on an inner periphery of the ball screw 53. When frictional resistance between the steered wheels 43 and a road surface is greater than the torque applied to the input shaft 52, the ball screw 53 does not rotate and the torsion bar 54 is twisted based on the torque applied to the input shaft 52. As the torsion bar 54 is twisted, the positional relationship (relative angle) between the inner valve 62 and the outer valve 63 in the rotational direction is changed. The control valve 61 switches the flow path of the hydraulic fluid on the basis of a change in the positional relationship. The control valve 61 adjusts the flow passage area based on the difference (valve operating angle) between the rotation angle of the input shaft 52 (inner valve 62) and the rotation angle of the ball screw 53 (outer valve 63), thereby adjusting the flow rate of the hydraulic fluid that is supplied to the oil chambers 58, 59. That is, the hydraulic fluid that is supplied through the discharge pipe 34 from the pump 32 is diverted to one of the two oil chambers 58, 59 based on a relative angular displacement between the inner valve 62 and the outer valve 63. The hydraulic fluid in the other one of the oil chambers 59, 58, which is not supplied with the hydraulic fluid, is pushed out of the other one of the oil chambers 59, 58 as the ball nut 56 is axially displaced in a direction away from the one of the oil chambers 58, 59 to which the hydraulic fluid is supplied from the pump 32. The hydraulic fluid pushed out of the other one of the oil chambers 58, 59 is drained to the reservoir tank 33 via the drain pipe 35.

Next, the torsion bars 21a, 54 will be described. The torsion bar 21a of the torque sensor 21 is twisted as the steering torque is applied to the steering wheel 15. Because a moderate reaction force (response) needs to be generated in response to an operation of the steering wheel 15, the torsion of the torsion bar 21a of the torque sensor 21 is used as the reaction force in the power steering system 11 to obtain the responsive feel. The responsive feel gained in response to the operation of the steering wheel 15, that is, so-called heaviness of steering, is generated by the torsion bar 21a. When the surface resistance is high, the torsion bar 21a is largely twisted to generate a high reaction force. On the other hand, when the surface resistance is low, the torsion angle is small and the reaction force is also small.

The torsion bar 54 of the steering gear box 31 is twisted as the output torque from the EPS 12, which contains the steering torque, is applied to the input shaft 52. Therefore, the torsional stiffness (spring constant) of the torsion bar 54 is usually set higher than that of the torsion bar 21a of the torque sensor 21. This is because the output torque from the EPS 12 is a value obtained by adding the assist force generated by the motor 22 to the steering torque applied to the steering wheel 15, and is a value higher than the steering torque. Therefore, in order to cause the EPS 13 to generate an appropriate assist force corresponding to a steering operation performed by the driver, the output torque from the EPS 12 needs to be taken into account to set the torsional stiffness of the torsion bar 54.

Figure 3:
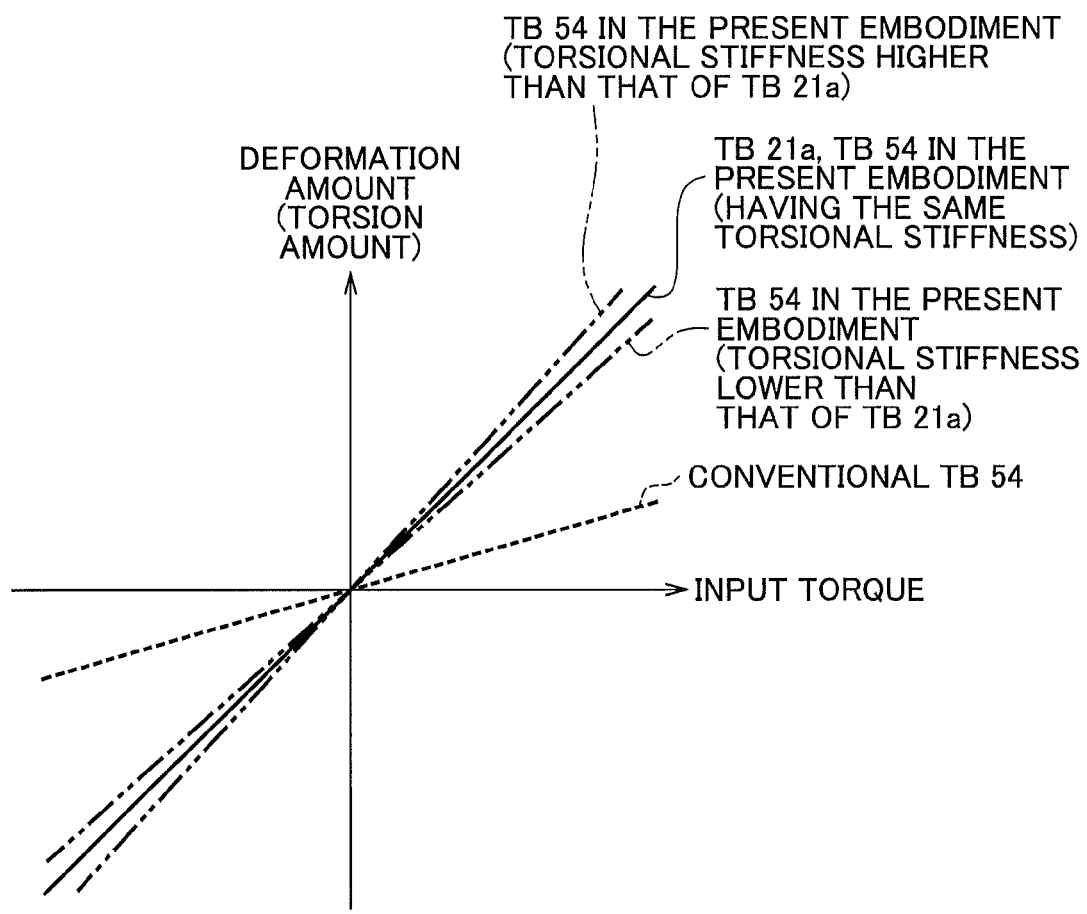
FIG. 3 is a graph illustrating the relationship between the input torque and the deformation amount of a torsion bar in the embodiment.

As illustrated in a graph in FIG. 3, the torsional stiffness of the torsion bar (TB) 54 is set substantially equal to the torsional stiffness of the torsion bar (TB) 21a in the present embodiment. "The torsional stiffness of the torsion bar (TB) 54 is substantially equal to the torsional stiffness of the torsion bar (TB) 21a" means not only that the two torsion bars 21a, 54 are equal in torsional stiffness to each other as indicated by a continuous line in the graph in FIG. 3 but also that the torsional stiffness of the torsion bar (TB) 54 is slightly higher than the torsional stiffness of the torsion bar 21a (indicated by a two-dot chain line above the continuous line) and the torsional stiffness of the torsion bar (TB) 54 is slightly lower than the torsional stiffness of the torsion bar 21a (indicated by a two-dot chain line below the continuous line) as indicated by two-dot chain lines in the graph in FIG. 3. Therefore, when the same magnitude of torque is applied to second ends of the torsion bars 21a, 54 with first ends of the torsion bars 21a, 54 being fixed, the torsion amounts (torsion angles) of the torsion bars 21a, 54 are substantially equal to each other. The torsional stiffness of the torsion bar 21a of the torque sensor 21 is set on the basis of the steering torque $\tau$ applied to the steering wheel 15 by the driver. When the steering torque $\tau$ generated by the driver's steering operation is 10 Nm at the maximum, each of the two torsion bars 21a, 54 is sufficiently twisted at 10 Nm. By setting the torsional stiffness of the torsion bar 54 of the HPS 13 substantially equal to the torsional stiffness of the torsion bar 21a of the EPS 12 as described above, it is possible to operate the control valve 61 through the steering operation by the driver even if the assist force from the EPS 12 is not obtained.

Figure 4:
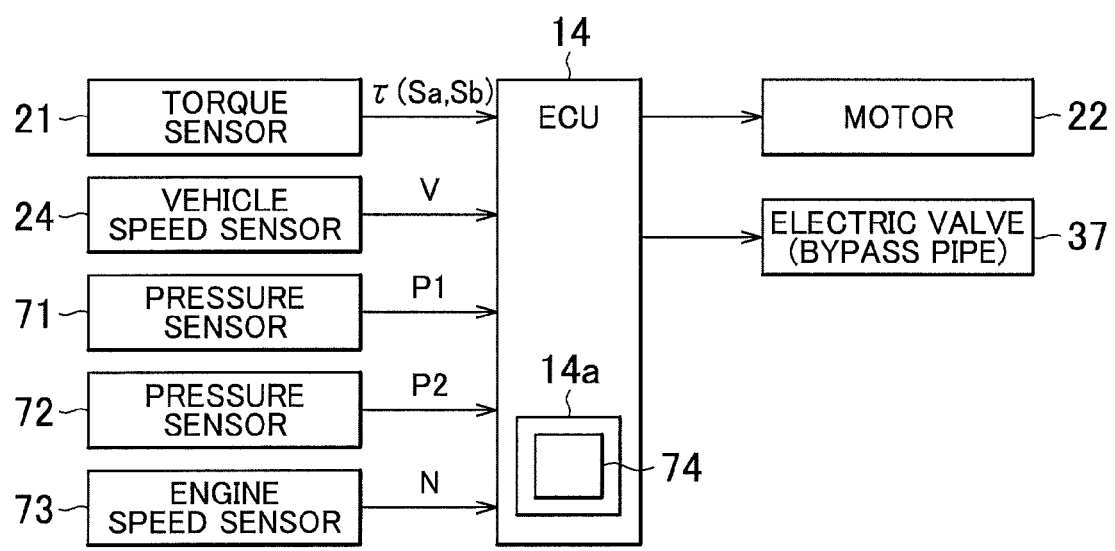
FIG. 4 is a block diagram illustrating the electrical configuration of the power steering system according to the embodiment.

The electrical configuration of the power steering system 11 will be described below. As illustrated in FIG. 4, the torque sensor 21, the vehicle speed sensor 24, two pressure sensors 71, 72, and an engine speed sensor 73 are connected to the ECU 14. The motor 22 and the electric valve 37 are connected to the ECU 14. The pressure sensor 71 detects a pressure in the discharge pipe (high-pressure pipe) 34 and the pressure sensor 72 detects a pressure in the drain pipe (low-pressure pipe) 35. The engine speed sensor 73 detects a rotational speed of the engine 44.

The ECU 14 computes a target assist torque, which is the target assist amount, based on the results of detection obtained by the torque sensor 21 and the vehicle speed sensor 24, that is, the steering torque $\tau$ (more specifically, the two electrical signals Sa, Sb) and the vehicle speed V. The ECU 14 computes an appropriate target assist amount corresponding to the present vehicle state on the basis of an assist map 74, stored in a memory 14*a* of the ECU 14.

Figure 5:
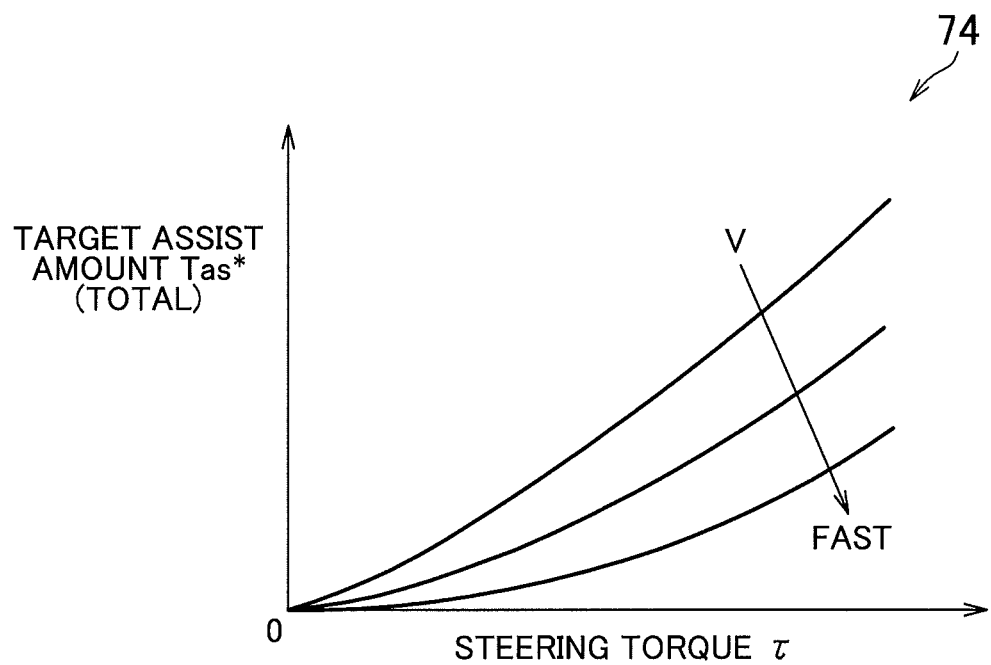
FIG. 5 is a graph illustrating an assist map in the embodiment.

As illustrated in FIG. 5, the assist map 74 is a vehicle speed-sensitive three-dimensional map for computing a target assist amount Tas* based on the steering torque $\tau$ and the vehicle speed V. According to the assist map 74, the target assist amount Tas* having a larger value (absolute value) is computed as the absolute value of the steering torque $\tau$ is higher and as the vehicle speed V is lower, so that a larger assist force is applied to a steering system.

The target assist amount Tas* computed based on the assist map 74 is the total assist amount that is the sum of the assist amount achieved by the EPS 12 (the amount of assist provided by the EPS 12) and the assist amount achieved by the HPS 13 (the amount of assist provided by the EPS 13). The ECU 14 controls the motor 22 and the electric valve 37 such that the target assist amount Tas* is obtained as a whole, while adjusting the assist amount to be achieved by the EPS 12 and the assist amount to be achieved by the HPS 13 as needed based on results of output from the various sensors.

The ECU 14 computes a target EPS assist amount Tas1* and a target HPS assist amount Tas2* based on the target assist amount Tas* and the steering torque $\tau$. The target EPS assist amount Tas1* is an assist amount that is contained in the target assist amount Tas* and that should be achieved by the EPS 12. The target HPS assist amount Tas2* is an assist amount that is contained in the target assist amount Tas* and that should be generated by the HPS 13. Theoretically, the following equation (1) is satisfied.

$$Tas1^*+Tas2^*=Tas^* \qquad (1)$$

The ECU 14 controls the assist amount to be achieved by the EPS 12 by adjusting the amount of currents supplied to the motor 22, and controls the assist amount to be achieved by the HPS 13 by adjusting the opening degree of the electric valve 37.

In the present embodiment, the driver's steering operation is assisted mainly by the EPS 12 as much as possible from the viewpoint of energy saving. If the diver's steering operation is not assisted sufficiently even when the maximum ability of the EPS 12 is fully utilized, the electric valve 37 disposed in the bypass pipe 36 is gradually closed based on a shortfall in the assist amount to increase the assist amount to be achieved by the HPS 13. The pump 32 is driven by the engine 44. Therefore, when the driver's steering operation is assisted by the HPS 13*a*, an extra load is placed on the engine 44 accordingly. Therefore, in the case where the required assist amount is small, as in the case where the vehicle is travelling at a high speed, the driver's steering operation should be assisted only by the EPS 12 without using the HPS 13. In this case, the fuel consumption is smaller and the amount of energy saving is larger than those in the case where a load due to the steering assist is maintained constantly placed on the engine 44.

The ECU 14 controls the electric valve 37 according to one of the following methods (A) and (B).

(A) The ECU 14 determines a target opening degree of the electric valve 37 based on an engine speed N and the target HPS assist amount Tas2*, and controls the electric valve 37 to achieve the target opening degree.

(B) The ECU 14 determines a target pressure difference between the pressure in the high pressure-side discharge pipe 34 and the pressure in the low pressure-side drain pipe 35 based on the engine speed N and the target HPS assist amount Tas2*, and executes feedback control on the electric valve 37 to make the difference between pressures P1, P2, which are respectively detected by the two pressure sensors 71, 72, coincide with the target pressure difference.

The rotational speed of the pump 32 is determined by the rotational speed of the engine 44. Thus, the flow rate of the hydraulic fluid that is supplied to the HPS 13 is determined basically according to the rotational speed of the engine 44. Therefore, it is possible to adjust the flow rate of the hydraulic fluid that is supplied to the HPS 13 by adjusting the opening degree of the electric valve 37 in the present embodiment. When the electric valve 37 is fully closed, most of the hydraulic fluid from the pump 32 is supplied to the HPS 13. At this time, the HPS 13 is able to exhibit its assisting ability to the fullest extent. However, the assist amount achieved by the HPS 13 is influenced by the rotational speed of the engine 44. On the other hand, when the electric valve 37 is fully open, most of the hydraulic fluid from the pump 32 flows to the drain pipe 35 through the bypass pipe 36, and thus almost no hydraulic fluid is supplied to the HPS 13. At this time, almost no steering assist is provided by the HPS 13. By changing the flow rate of the hydraulic fluid that is supplied to the HPS 13 on the basis of the opening degree of the electric valve 37 in this way, it is possible to control the assist amount achieved by the HPS 13.

The ECU 14 has a function of detecting malfunctions of the EPS 12 and the HPS 13. The ECU 14 detects, for example, each of the following conditions (C), (D) as a malfunction of the EPS 12. The ECU 14 fully closes the electric valve 37 when a malfunction of the EPS 12 is detected.

(C) A malfunction of the torque sensor 21 (electrical signals Sa, Sb) is detected.

When the values of the two electrical signals Sa, Sb deviate from values of the electrical signals Sa, Sb at normal times, the electrical signals Sa, Sb that deviate from the normal values are abnormal.

When the values of the two electrical signals Sa, Sb or the amounts of change in the two electrical signals Sa, Sb per unit time are not equal to each other, at least one of the two electrical signals Sa, Sb is abnormal.

(D) A malfunction of the motor 22 is detected.

The ECU 14 controls the power supply to the motor 22 through pulse width modulation (PWM) using a motor driver (PWM inverter (not illustrated)). The ECU 14 detects a current that is supplied to the motor 22 using a current sensor (not illustrated). When the value of current supplied to the motor 22 is zero despite the fact that the duty ratio of a PWM control signal for the motor driver is set at 100%, a malfunction such as disconnection occurs in the motor 22 or a power supply path to the motor 22.

The ECU 14 detects, for example, the following condition (E) as a malfunction of the HPS 13. The ECU 14 fully opens the electric valve 37 disposed in the bypass pipe 36 when a malfunction of the HPS 13 is detected.

(E) When the difference between the pressure in the discharge pipe 34, which is detected by the high pressure-side pressure sensor 71, and the pressure in the drain pipe 35, which is detected by the low pressure-side pressure sensor 72, falls out off a prescribed normal range, there is a possibility that the pump 32 is not operating properly.

The operation of the power steering system 11 will be described below. First, the operation of the power steering system 11 when both the EPS 12 and the HPS 13 are operating properly will be described.

The ECU 14 executes control in the following manner. The driver's steering operation is assisted only by the EPS 12 until the required assist amount (target assist amount Tas*) reaches the critical power of the EPS 12 (the maximum assist amount achievable by the EPS 12). When the required assist amount cannot be achieved only by the EPS 12, the assist amount achieved by the HPS 13 is added to the assist amount achieved by the EPS 12 on the basis of a shortfall in the required assist amount.

Figure 6:
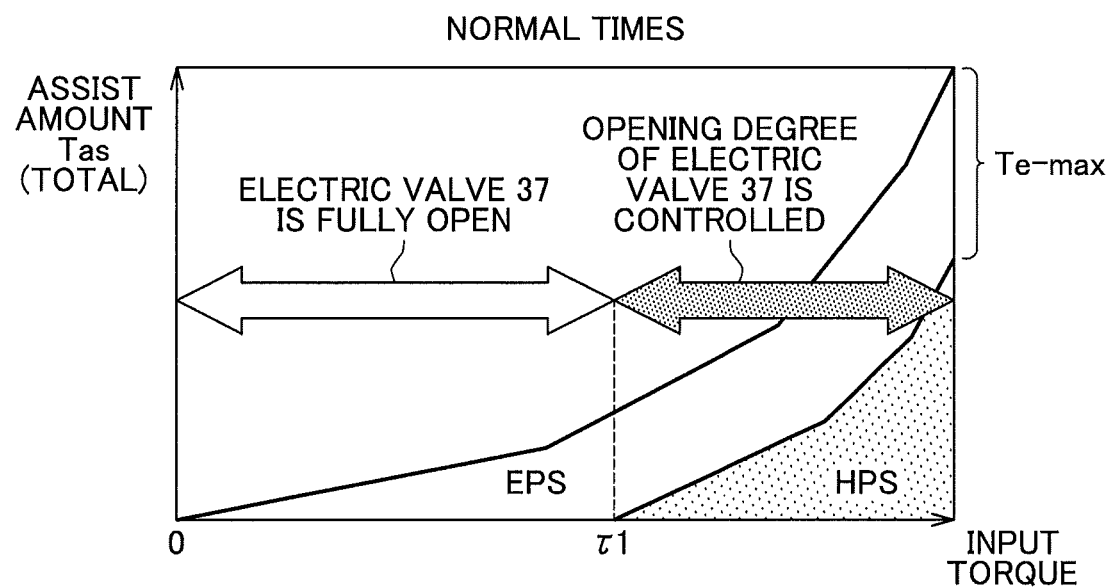
FIG. 6 is a graph illustrating the ratio between the assist amount achieved by an electric power steering and the assist amount achieved by a hydraulic power steering at normal times according to the embodiment.

As illustrated in a graph in FIG. 6, the ECU 14 executes control such that the driver's steering operation is assisted only by the EPS 12 until the input torque (steering torque $\tau$) reaches a threshold $\tau1$. The threshold $\tau1$ is set based on the critical power of the EPS 12. That is, the total assist amount that is required when the input torque reaches the threshold $\tau1$ is a maximum assist amount Te-max that is able to be generated by the EPS 12.

The ECU 14 keeps the electric valve 37 fully open until the input torque reaches the threshold $\tau1$. Because most of the hydraulic fluid from the pump 32 is returned to the reservoir tank 33 through the bypass pipe 36, almost no hydraulic fluid is supplied to the HPS 13. Therefore, the assist amount achieved by the HPS 13 is a value close to zero. After the input torque reaches the threshold $\tau1$, the ECU 14 gradually decreases the opening degree of the electric valve 37 based on an increase in the input torque. As the opening degree of the electric valve 37 is decreased, the flow rate of the hydraulic fluid that is supplied to the HPS 13 increases. The assist amount achieved by the HPS 13 is increased with an increase in the flow rate of the hydraulic fluid. A total assist amount Tas is gradually increased with an increase in the assist amount achieved by the HPS 13, as the assist amount achieved by the HPS 13 is added to the assist amount achieved by the EPS 12.

The assist torque generated by the EPS 12, in addition to the steering torque $\tau$ applied to the steering wheel 15 by the driver, is applied to the input shaft 52 for the HPS 13. The torsion bar 54 of the control valve 61 has a torsional stiffness substantially equal to the torsional stiffness of the torsion bar 21a of the EPS 12. That is, the torsional stiffness of the torsion bar 54 is set such that the torsion bar 54 is sufficiently twisted by the steering torque $\tau$ applied by the driver. Thus, the control valve 61 is substantially fully open when the steering torque $\tau$ and the assist torque generated by the EPS 12 are both applied to the input shaft 52 for the control valve 61. Therefore, the assist amount to be achieved by the HPS 13 is adjusted by adjusting the opening degree of the electric valve 37.

The operation of the power steering system 11 when a malfunction occurs in the EPS 12 will be described below.

When a malfunction occurs in the EPS 12, the assist amount achieved by the EPS 12 is zero. The assist amount achieved by the HPS 13 is used as it is, as the total assist amount Tas. The ECU 14 keeps the electric valve 37 fully closed. Thus, the hydraulic fluid from the pump 32 is entirely supplied to the HPS 13. The torsion bar 54 is twisted based on the input torque (steering torque $\tau$, in this case) input into the input shaft 52 for the control valve 61, so that the opening degree of the control valve 61 is changed based on the degree of torsion of the torsion bar 54. The hydraulic fluid with a flow rate corresponding to the opening degree is supplied to the oil chamber 58 or the oil chamber 59. The HPS 13 generates an assist force corresponding to the flow rate of the hydraulic fluid supplied to the oil chamber 58 or 59 and the rotational speed of the engine 44 at the present moment.

Figure 7:
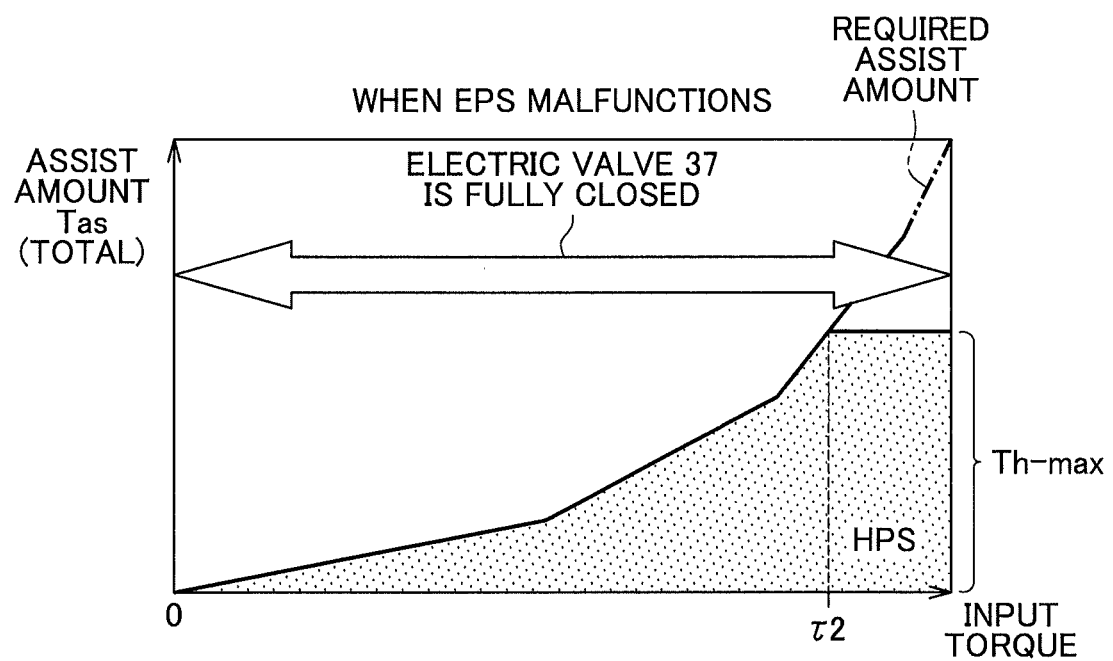
FIG. 7 is a graph illustrating variations of the assist amount achieved by the hydraulic power steering with respect to the input torque when the electric power steering malfunctions in the embodiment.

As illustrated in a graph in FIG. 7, the assist amount achieved by the HPS 13 increases with an increase in the input torque. After the input torque reaches a threshold $\tau2$ ($>\tau1$), the assist amount achieved by the HPS 13 is maintained constant regardless of the input torque. That is, after the input torque reaches the threshold $\tau2$, the originally required total assist amount reaches the maximum assist amount Th-max that is achievable by the HPS 13. The threshold $\tau2$ is determined by the critical power of the HPS 13.

Although the assist torque by the EPS 12 is not obtained, the steering feel gained by the driver is similar to that when the EPS 12 is operating properly. When the EPS 12 malfunctions, the responsive feel gained in response to the operation of the steering wheel 15 depends on not only the torsion bar 21a but also the torsion bar 54. In the present embodiment, the torsional stiffness of the torsion bar 54 is set substantially the same as the torsional stiffness of the torsion bar 21a, and thus the steering feel gained by the driver is similar to that when the EPS 12 is operating properly.

The operation of the power steering system 11 when a malfunction occurs in the HPS 13 will be described below.

When a malfunction occurs in the HPS 13, the assist amount achieved by the HPS 13 is zero. The assist amount achieved by the EPS 12 is used as it is, as the total assist amount Tas. The ECU 14 generates the assist torque corresponding to the input torque (steering torque $\tau$, in this case) through the control of the motor 22.

Figure 8:
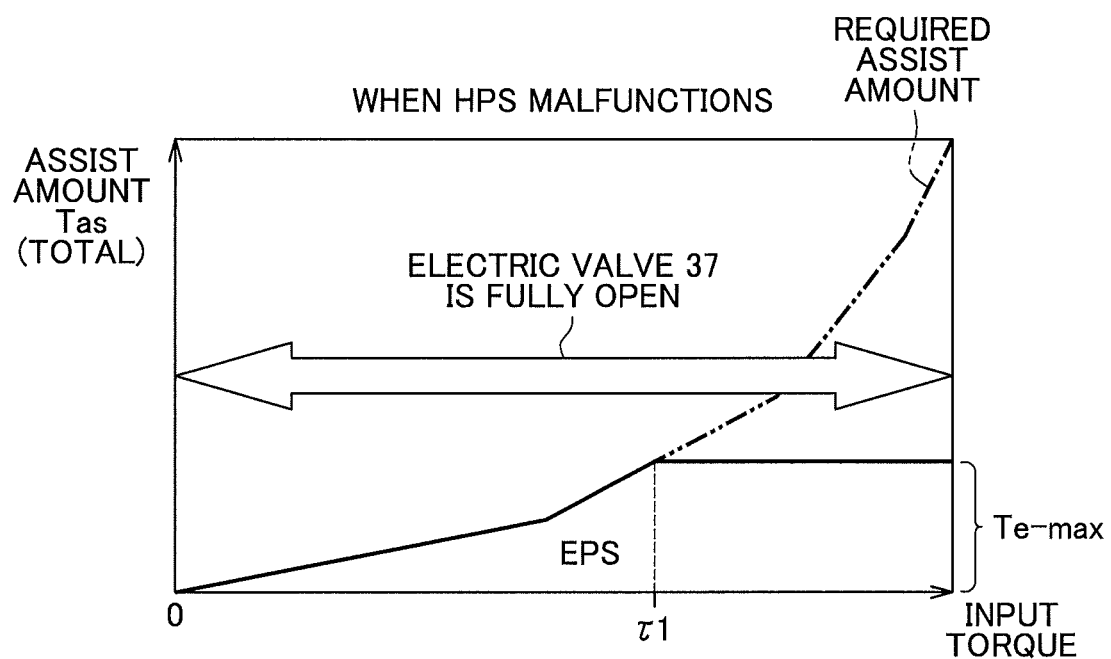
FIG. 8 is a graph illustrating variations of the assist amount achieved by the electric power steering with respect to the input torque when the hydraulic power steering malfunctions in the embodiment.

As illustrated in a graph in FIG. 8, until the input torque reaches the threshold $\tau1$ corresponding to the critical power of the EPS 12, the assist amount achieved by the EPS 12 increases with an increase in the input torque. After the input torque reaches the threshold $\tau1$, the assist amount achieved by the EPS 12 is maintained constant regardless of the input torque. That is, after the input torque reaches the threshold $\tau1$, the originally required total assist amount reaches the maximum assist amount Te-max that is achievable by the EPS 12.

When a malfunction occurs in the HPS 13, the ECU 14 keeps the electric valve 37 fully open for the following reason. There are various factors of a malfunction of the HPS 13. For example, a malfunction may occur in the control valve 61 although the pump 32 is operating properly. The following description will be provided on the assumption that the torsion bar 54 is stuck twisted in one direction (becomes immovable after being twisted in one direction). In this case, the hydraulic fluid is supplied to only one of the two oil chambers 58, 59. Thus, the pressure in the oil chamber 58 or 59 to which the hydraulic fluid is supplied gradually increases if the electric valve 37 is closed. However, if the electric valve 37 is open, the hydraulic fluid from the pump 32 is returned to the reservoir tank 33 through the bypass pipe 36. In this way, it is possible to prevent an excessive increase in the pressure in the oil chamber 58, 59 to which the hydraulic fluid is supplied.

Next, the action of the power steering system 11 will be described. First, a power steering system as a comparative example will be described below. In this comparative example, the bypass pipe 36 and the electric valve 37 are not provided. For convenience of description, the vehicle speed V is not taken into account in this comparative example.

In the comparative example illustrated in FIG. 9, the torsional stiffness of the torsion bar 54 is sufficiently higher than the torsional stiffness of the torsion bar 21a. The maximum steering torque τ generated by an average driver is 10 Nm. The EPS 12 includes the torsion bar 21a having such a degree of stiffness that the torsion bar 21a is sufficiently twisted when the steering torque τ of 10 Nm is applied to the steering wheel 15, and the EPS 12 is able to exhibit its assisting ability to the fullest extent when the steering torque τ of 10 Nm is applied to the steering wheel 15. The EPS 12 amplifies the steering torque τ to, for example, 100 Nm, which is ten times as high as the steering torque τ of 10 Nm.

The HPS 13 includes the torsion bar 54 having such a degree of stiffness that the torsion bar 54 is sufficiently twisted when the output torque of 100 Nm, which is the critical power of the EPS 12, is applied to the HPS 13, and the HPS 13 is able to exhibit its assisting ability to the fullest extent when the output torque of 100 Nm is applied to the HPS 13. The HPS 13 amplifies the output torque of 100 Nm from the EPS 12 to, for example, 1000 Nm, which is ten times as high as the output torque of 100 Nm.

Figure 10:
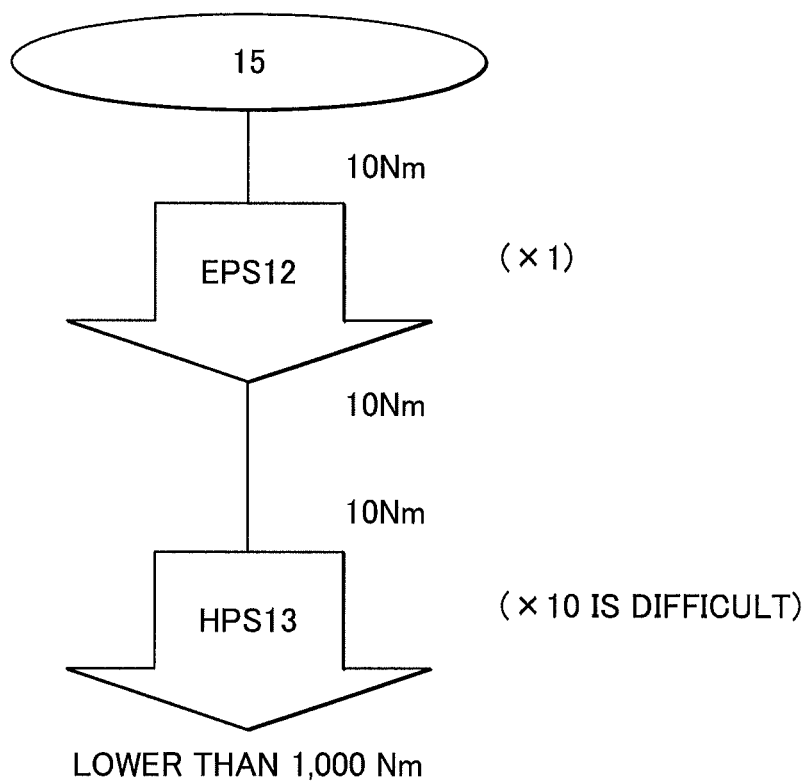
FIG. 10 is a conceptual diagram illustrating the concept of steering assist provided by the electric power steering and the hydraulic power steering when the electric power steering malfunctions in a comparative example.

FIG. 9 illustrates the comparative example in which the EPS 12 is operating properly. On the other hand, if a malfunction occurs in the EPS 12 and an assist force from the EPS 12 is not obtained as illustrated in FIG. 10, the steering torque τ of 10 Nm applied by the driver is used as it is, as the output torque from the EPS 12. The HPS 13 is able to exhibit its assisting ability to the fullest extent when the output torque of 100 Nm is applied to the HPS 13. Therefore, in a comparative example in FIG. 10, the assist of 1000 Nm is not obtained unlike in the comparative example in FIG. 9 in which the EPS 12 is operating properly.

When a malfunction occurs in the EPS 12 and the assist force from the EPS 12 is not obtained, the steering torque τ of 100 Nm needs to be applied to the steering wheel 15 in order to allow the HPS 13 to exhibit its assisting ability to the fullest extent. However, it is difficult to allow the HPS 13 to exhibit its assisting ability to the fullest extent, because the steering torque τ required to obtain the steering assist from the HPS 13 is excessively high. That is, if the steering assist from the EPS 12 is stopped and thus the steering assist is provided only by the HPS 13, the driver's steering operation becomes considerably heavy, leading to a difficulty in smooth steering.

In the present embodiment, the following configuration is adopted to obtain the steering feel similar to that at normal times even if the EPS 12 malfunctions. The torsional stiffness of the torsion bar 54 of the HPS 13 is set to a low value that is substantially equal to the torsional stiffness of the torsion bar 21a of the EPS 12. The torsional stiffness of the torsion bar 54 is set to one-tenths of that in the comparative example illustrated in FIG. 9. The torsion bar 54 in the present embodiment is twisted ten times as much as the torsion bar 54 in the comparative example illustrated in FIG. 9. Thus, the HPS 13 is able to exhibit its assisting ability to the fullest extent even when the steering torque τ of 10 Nm, which is the maximum steering torque that can be applied by an average driver, is applied to the steering wheel 15. Because the torsional stiffness of the torsion bar 54 is one-tenths of that in the comparative example, the HPS 13 amplifies the torque 100-fold, not 10-fold as in the comparative example. This is because the torsional stiffness of the torsion bar 54 is decreased and the torsion amount of the torsion bar 54 upon application of the same steering torque τ is increased accordingly. The torsion amount of the torsion bar 54 is increased, and the opening degree of the control valve 61 is increased and the flow rate of the hydraulic fluid is increased accordingly. Thus, the steering torque τ of 10 Nm, which is the output torque from the EPS 12, is amplified by the HPS 13 to 1000 Nm, which is 100 times as high as 10 Nm.

As described above, even when the EPS 12 malfunctions, the steering torque τ that is required to allow the HPS 13 to exhibit its assisting ability to the fullest extent is substantially equal to that when the EPS 12 is operating properly. Further, it is possible to gain substantially the same steering feel as that when the EPS 12 is operating properly. In addition, the final assist amount achieved by the HPS 13 is 1000 Nm that is equal to the final assist amount achieved when the EPS 12 is operating properly in the comparative example illustrated in FIG. 9.

As described above, by setting the torsional stiffness of the torsion bar 54 to a low value, an appropriate assist amount is achieved by the HPS 13 when the EPS 12 malfunctions. However, when the EPS 12 is operating properly, the following concerns may be raised.

Figure 11:
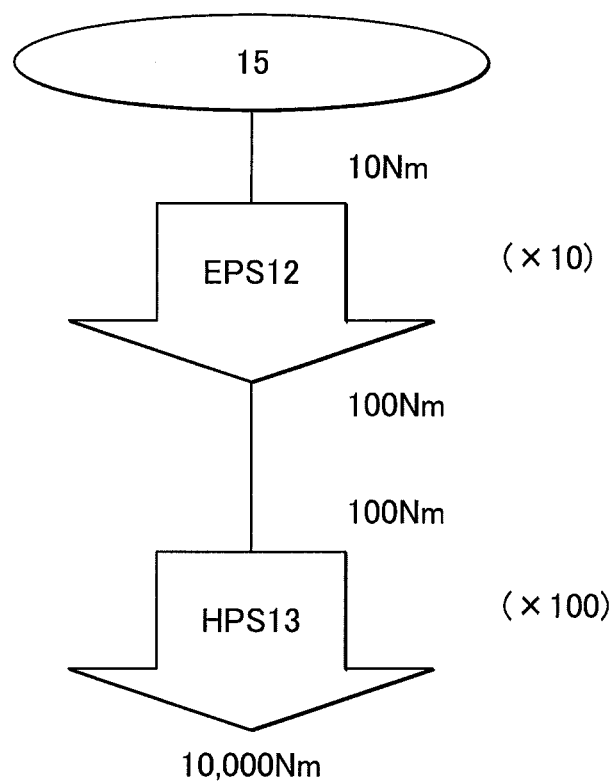
FIG. 11 is a conceptual diagram illustrating the concept of steering assist provided by the electric power steering and the hydraulic power steering at normal times in a comparative example.

As illustrated in FIG. 11, when the EPS 12 is operating properly, the steering torque τ of 10 Nm that is applied to the steering wheel 15 is amplified 10-fold to 100 Nm. As described above, the torsional stiffness of the torsion bar 54 of the HPS 13 is set to a low value that is substantially equal to the torsional stiffness of the torsion bar 21a of the EPS 12. Thus, the opening degree of the control valve 61 is maximized and thus the HPS 13 exhibits its assisting ability to the fullest extent. Thus, the HPS 13 amplifies the output torque of 100 Nm from the EPS 12 100-fold to 10000 Nm, which is 100 times as high as 100 Nm. As described above, the total assist amount is excessive when the EPS 12 is operating properly.

Therefore, the bypass pipe 36 and the electric valve 37 are provided in the present embodiment. At normal times, it is possible to limit the assisting ability of the HPS 13 by adjusting the opening degree of the electric valve 37. This is because it is possible to adjust the flow rate of the hydraulic fluid that is supplied to the HPS 13 based on the opening degree of the electric valve 37.

Figure 12:
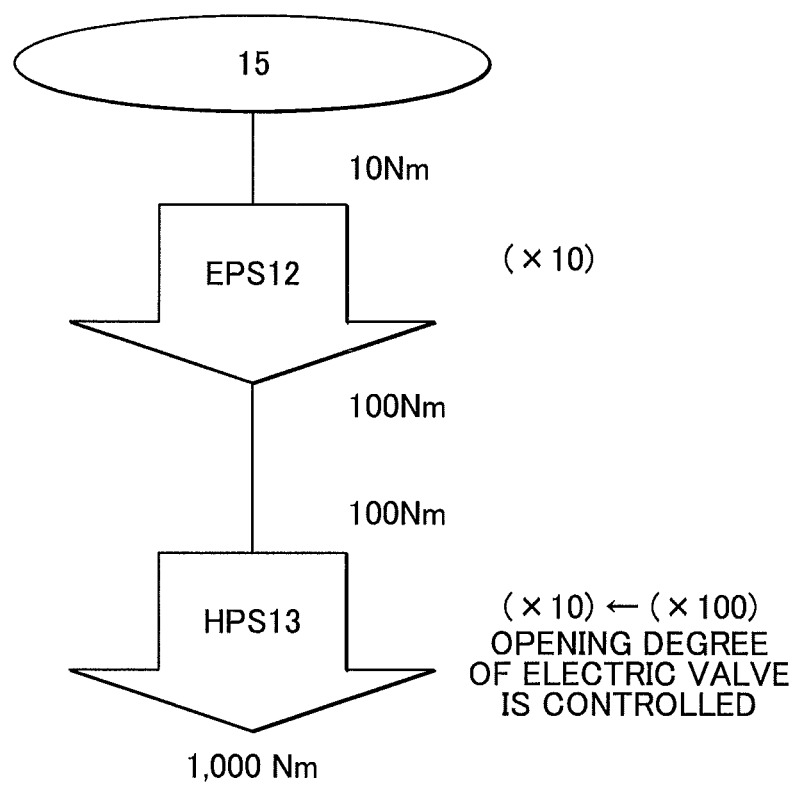
FIG. 12 is a conceptual diagram illustrating the concept of steering assist provided by the electric power steering and the hydraulic power steering at normal times in the embodiment.

As illustrated in FIG. 12, when the EPS 12 is operating properly, the steering torque τ of 10 Nm applied to the steering wheel 15 is amplified 10-fold to 100 Nm. Because the torsional stiffness of the torsion bar 54 of the HPS 13 is set to a low value that is substantially equal to the torsional stiffness of the torsion bar 21a of the EPS 12 as described above, the opening degree of the control valve 61 is maximized and thus the HPS 13 exhibits its assisting ability to the fullest extent. In order to obtain, as the final assist torque, the assist torque of 1000 Nm that equal to the assist torque obtained when the EPS 12 is operating properly in the comparative example illustrated in FIG. 9, the assisting ability of the HPS 13 needs to be limited to one-tenths of that in the comparative example illustrated in FIG. 11. That is, the opening degree of the electric valve 37 is adjusted such that 90% of the hydraulic fluid discharged from the pump 32 is returned to the reservoir tank 33 through the bypass pipe 36 and the remaining 10% of the hydraulic fluid is supplied to the HPS 13. The assisting ability of the HPS 13 limited to one-tenths of that in the comparative example in FIG. 11 as the flow rate of the hydraulic fluid supplied to the HPS 13 is limited to one-tenths of that in the comparative example illustrated in FIG. 11. Thus, the HPS 13 amplifies the output torque of 100 Nm to 1000 Nm, which is not 100 times but 10 times as high as 100 Nm, as illustrated in FIG. 12. By controlling the flow rate of the hydraulic fluid that is supplied to the HPS 13 through adjustment of the opening degree of the electric valve 37 as described above, it is possible to flexibly control the assist amount to be achieved by the HPS 13.

According to the present embodiment, it is possible to obtain the following advantageous effects.

(1) The power steering system 11 includes the EPS 12 and the HPS 13. Even if one of the EPS 12 and the HPS 13 malfunctions, it is possible to continue the steering assist with the use of the other one of the HPS 13 and the EPS 12, which is operating properly.

(2) The torsional stiffness of the torsion bar 54 of the HPS 13 is substantially equal to the torsional stiffness of the torsion bar 21a of the EPS 12. Thus, even if the EPS 12 malfunctions, it is possible to obtain substantially the same steering feel as that when the EPS 12 is operating properly.

(3) There are provided the bypass pipe 36 that connects the high pressure-side discharge pipe 34 and the low pressure-side drain pipe 35 to each other, and the electric valve 37 that opens or closes the bypass pipe 36. It is possible to control the assist amount to be achieved by the HPS 13 by adjusting the opening degree of the electric valve 37.

(4) The electric valve 37 is fully closed when the EPS 12 malfunctions. The assist amount that is supposed to be achieved by the EPS 12 is covered by allowing the HPS 13 to exhibit its assisting ability to the fullest extent. In this way, it is possible to minimize a shortfall in the total assist force.

(5) The electric valve 37 is fully opened when the HPS 13 malfunctions. The flow of the hydraulic fluid may be hindered for some reason. In this case, an excessive pressure may be generated in, for example, the oil chamber 58, or 59 due to continuous supply of the hydraulic fluid from the pump 32. However, the hydraulic fluid from the pump 32 is returned to the reservoir tank 33 through the bypass pipe 36 by fully opening the electric valve 37. Thus, it is possible to suppress generation of an excessive pressure in, for example, the oil chambers 58, 59.

(6) The electric valve 37 is controlled by the ECU 14 that controls the EPS 12. Thus, it is possible to efficiently assist the driver's steering operation.

(7) At normal times, the ECU 14 collectively controls the assist amount to be achieved by the EPS 12 and the assist amount to be achieved by the HPS 13. The driver's steering operation is assisted only by the EPS 12 until the required assist amount reaches the critical power of the EPS 12. When the assist amount achieved by the EPS 12 is not sufficient, the assist amount achieved by the HPS 13 is added to the assist amount achieved by the EPS 12 based on a shortfall in the assist amount. By giving a higher priority to the EPS 12 than to the HPS 13 when they are used, the load on the engine 44 is reduced and energy is saved accordingly. In addition, the fuel economy is improved.

(8) It is possible to deal with both the state where the EPS 12 is operating properly and the state where the EPS 12 malfunctions, just by providing the electric valve 37 in the bypass pipe 36. An appropriate assist amount is achieved through adjustment of the opening degree of the electric valve 37.

(9) In a strict sense, the assist amount achieved by the HPS 13 is influenced by, for example, mechanical variations of the control valve 61 and the pump 32. When the influence is taken into account in controlling the assist amount to be achieved by the HPS 13, feedback control should be executed on the opening degree of the electric valve 37 based on the pressures P1, P2 respectively detected by the two pressure sensors 71, 72.

The above-described embodiment may be modified as follows. The opening degree of the electric valve 37 may be adjusted continuously or may be adjusted in a stepwise manner.

The target assist amount Tas* is computed based on the steering torque τ and the vehicle speed V in the above-described embodiment. Alternatively, the target assist amount Tas* may be computed based on at least the steering torque τ. The difference in pressure between the discharge pipe 34 and the drain pipe 35 is obtained with the use of the two pressure sensors 71, 72 in the above-described embodiment. Alternatively, a single differential pressure sensor may be disposed between the discharge pipe 34 and the drain pipe 35.

The ECU 14 may be exclusive to the EPS 12. An additional ECU that controls the electric valve 37 may be provided, or an ECU of another vehicle system may also control the electric valve 37. The two pressure sensors 71, 72 may be omitted. In this case, the control of the electric valve 37 is executed according to the above-described method (A) in which the pressure sensors 71, 72 are not used. In addition, a malfunction of the HPS 13 is detected according to a method in which the pressure sensors 71, 72 are not used. The ECU 14 determines that a malfunction has occurred in the HPS 13, for example, when the steering assist is not executed although the driver's steering operation should be assisted by the HPS 13. Specifically, the ECU 14 detects an output torque from the EPS 12 and thus an axial force acting in the axial direction of the steered wheels 43 by multiplying the motor current by the steering torque τ (input torque). In addition, the ECU 14 computes a momentum of the vehicle such as a yaw rate based on the vehicle speed and the steering angle, and computes a total axial force that should be generated by the power steering system 11 based on the computed momentum of the vehicle. The ECU 14 determines whether an axial force is generated by the HPS 13 by comparing the total axial force that should be generated and the axial force generated by the EPS 12. The ECU 14 determines that a malfunction has occurred in the HPS 13 when the axial force generated by the EPS 12 is smaller than the total axial force that should be generated by the power steering system 11 although the axial force generated by the EPS 12 exhibits a value corresponding to the critical power of the EPS 12. In this way, it is possible to determine whether the HPS 13 assists the driver's steering operation while the vehicle is travelling, without providing the pressure sensors 71, 72.

In the above-described embodiment, there are provided the bypass pipe 36 that connects the high pressure-side discharge pipe 34 and the low pressure-side drain pipe 35 to each other and the electric valve 37 that opens or closes the bypass pipe 36. However, a configuration in which the bypass pipe 36 and the electric valve 37 are omitted may be adopted. With this configuration, even when the EPS 12 malfunctions, it is possible to gain the steering feel similar to that when the EPS 12 is operating properly.

The RBS-type steering mechanism is adopted in the above-described embodiment. Alternatively, a rack-and-pinion-type steering mechanism may be adopted. The rack-and-pinion mechanism changes the orientation of the wheels by converting the rotation of a pinion shaft linked to the steering wheel 15 into a linear motion of a rack shaft meshed with the pinion shaft. The HPS 13 assists the driver's steering operation by assisting the operation of the rack shaft. That is, an assist force is generated by introducing the hydraulic fluid supplied from the pump 32 via the control valve 61 to a power cylinder disposed coaxially with the rack shaft. When the rack-and-pinion-type steering mechanism is adopted, the input shaft 52 for the control valve 61 and the pinion shaft are connected to each other via the torsion bar 54. The flow rate of the hydraulic fluid that is supplied to the power cylinder is adjusted based on the valve operating angle, which is the difference between the rotation angle of the input shaft 52 and the rotation angle of the pinion shaft.

What is claimed is:

1. A power steering system comprising:
   an electric power steering including a motor serving as an electric actuator that generates a first steering assist force based on a torsion amount of a first torsion bar to which steering torque is applied;
   a hydraulic power steering including
      a hydraulic actuator that generates a second steering assist force based on a flow rate of a hydraulic fluid supplied from a pump that operates using an internal combustion engine as a driving source, and
      a control valve that controls supply of the hydraulic fluid to the hydraulic actuator and drain of the hydraulic fluid from the hydraulic actuator based on a torsion amount of a second torsion bar to which the steering torque and the first steering assist force are applied;
   an electric valve that provides or interrupts communication between a supply path through which the hydraulic fluid is supplied to the control valve and a drain path through which the hydraulic fluid is drained from the control valve; and
   a controller that adjusts the flow rate of the hydraulic fluid that is supplied to the control valve by controlling an opening degree of the electric valve,
   wherein the second torsion bar has a torsional stiffness that is equal to or substantially equal to a torsional stiffness of the first torsion bar, and
   wherein the controller fully closes the electric valve when the electric power steering malfunctions.

2. The power steering system according to claim 1, wherein the controller fully opens the electric valve when the hydraulic power steering malfunctions.

3. The power steering system according to claim 1, wherein the controller serves as a controller for the motor.

4. The power steering system according to claim 2, wherein the controller serves as a controller for the motor.

5. The power steering system according to claim 3, wherein:
   the controller computes a required steering assist force based on the steering torque; and
   the controller controls the opening degree of the electric valve in a manner such that
   until the required steering assist force reaches a maximum steering assist force that the electric power steering is able to generate, the steering assist force is generated only by the electric power steering, and
   when the required steering assist force exceeds the maximum steering assist force that the electric power steering is able to generate, a steering assist force corresponding to a shortfall in the steering assist force generated by the electric power steering is generated by the hydraulic power steering.

6. The power steering system according to claim 4, wherein
   the controller computes a required steering assist force based on the steering torque; and
   the controller controls the opening degree of the electric valve in a manner such that until the required steering assist force reaches a maximum steering assist force that the electric power steering is able to generate, the steering assist force is generated only by the electric power steering, and
   when the required steering assist force exceeds the maximum steering assist force that the electric power steering is able to generate, a steering assist force corresponding to a shortfall in the steering assist force generated by the electric power steering is generated by the hydraulic power steering.

* * * * *